UNITED STATES PATENT OFFICE.

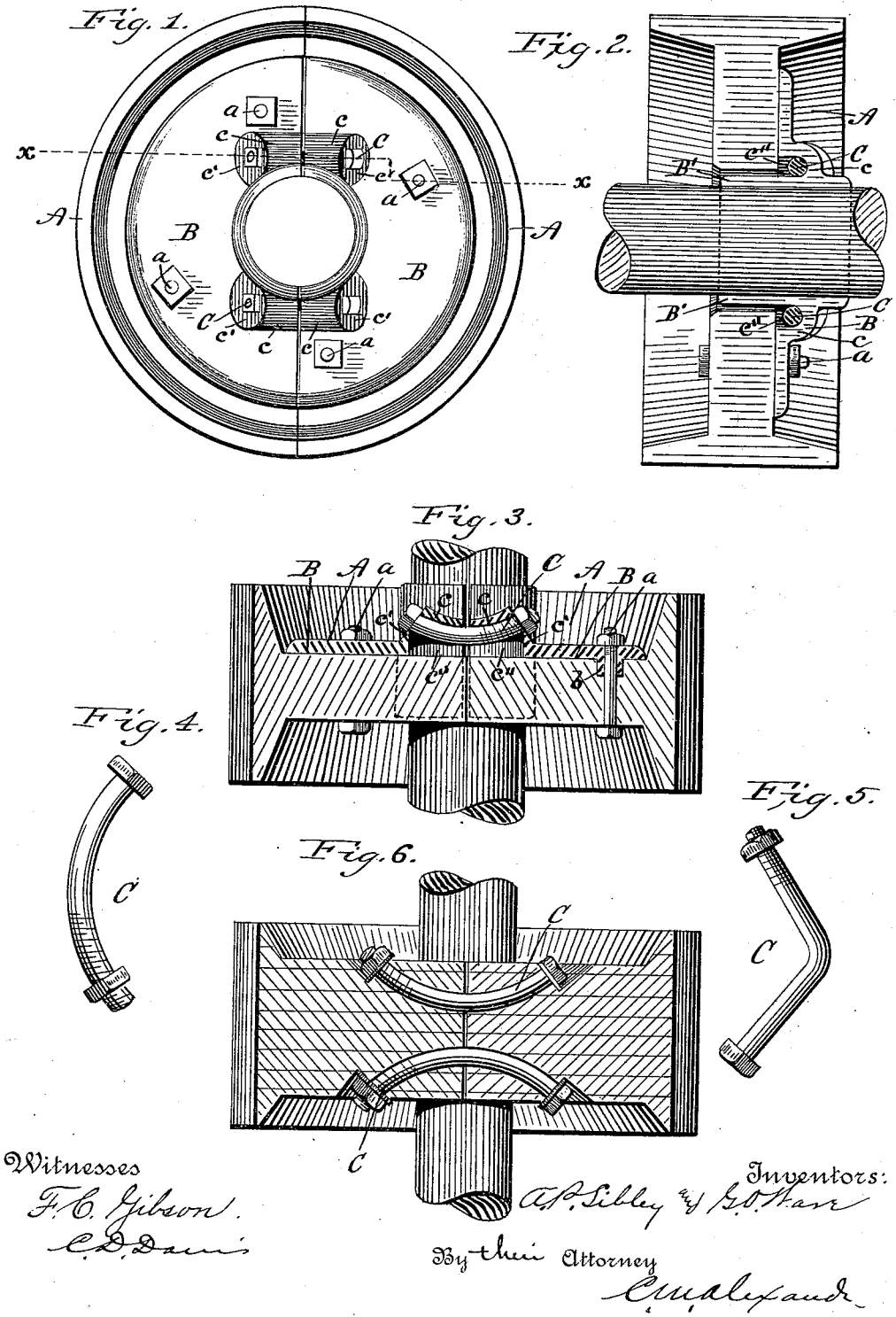

ALBERT P. SIBLEY AND GEORGE O. WARE, OF SOUTH BEND, INDIANA.

SPLIT PULLEY.

SPECIFICATION forming part of Letters Patent No. 437,520, dated September 30, 1890.

Application filed April 12, 1890. Serial No. 347,631. (No model.)

*To all whom it may concern:*

Be it known that we, ALBERT P. SIBLEY and GEORGE O. WARE, citizens of the United States, residing at South Bend, in the county of St. Joseph and State of Indiana, have invented certain new and useful Improvements in Split Pulleys, of which the following is a specification, reference being had therein to the accompanying drawings, in which—

Figure 1 represents a side elevation of our improved pulley; Fig. 2, a central sectional view thereof; Fig. 3, a sectional view taken through the line $x\ x$ of Fig. 1; Figs. 4 and 5, detail views of different forms of clamping-bolts that may be employed, and Fig. 6 a sectional view of the invention applied to an all-wood pulley.

The object of the present invention is to produce a very simple device for removably and adjustably clamping the sections of split pulleys together upon a shaft, as will be more fully hereinafter described, and particularly pointed out in the claims appended.

In the accompanying drawings, A A designate the two sections or halves of an ordinary wooden split pulley. Bolted to one side of this pulley by means of long bolts $a$, passing entirely through the same, are the two half flanges or plates B B, one of which is secured to each half of the pulley. The flanges are each provided with semi-tubular hub portions B', which extend through the eye of the pulley and are adapted to embrace and clamp the shaft when the clamping-bolts are tightened. Formed on the inner faces of the plates B around the bolt-apertures thereof are tubular bosses or extensions $b$, which enter recesses formed in the adjacent faces of the pulley, and thereby serve to assist in holding the plates rigidly in place and strengthen the parts generally.

The letter C designates the two clamping-bolts employed to secure the two sections of the pulley together and upon the shaft. These bolts pass through ears $c\ c$, formed upon the adjacent edges of the flanges B, and are provided with the usual tightening-nuts. Instead of arranging these bolts at right angles to the shaft upon which the pulley is secured, as has been heretofore done, they are formed and applied as shown in Fig. 3—that is, the bolts are bent to a curve and turned in toward the pulley-body, so that the ends of the bolts will be at oblique angles to the axial line of the shaft, the nuts and heads on the bolts bearing squarely against the obliquely-set outer ends $c'$ of the ears $c\ c$. The bolt-passages through the ears $c$ are of course curved correspondingly to the bolts, and are also formed open on the inner sides of the plates, as at $c''$, for convenience in casting and applying the bolts. Instead of curving the bolts, as shown in Figs. 3 and 4, it is evident that the same results may be obtained by simply bending them to a suitable angle midway their ends, as shown in Fig. 5.

Only one set of flanges is shown and described; but it is obvious that where wider pulleys are used two sets may be employed—one on each side of the pulley.

As the invention may be employed upon pulleys constructed wholly of wood or metal, as shown in Fig. 6, it is obvious that we do not wish to be confined to the use of flanges bolted to the pulley, but may do without them entirely, if it is found desirable.

This invention possesses a number of important advantages, the most essential of which probably is that by bending and setting the bolts, as described, the hub-sections will clamp the shaft as tightly at their opposite ends as they do at the ends where they are placed, or, in other words, by arranging the bolts as shown the clamping action of the hub-sections will be the same along their entire length—a great advantage over the old way of clamping the sections to the shaft, as is evident. This manner of securing the sections to the shaft also in small pulleys obviates the employment of one set of flanges and bolts, as it has heretofore been found necessary to use flanges or plates upon both sides of the pulley. Another advantage in setting the ends of the bolts at an oblique angle to the face of the pulley is that the nuts may be more easy of access for tightening purposes. It is also advantageous, in that it gives the greatest strength with a minimum amount of metal, and further that the flanges will be easier to cast, as no cores will be required, as in the old form of flange.

Having thus fully described our invention, what we claim, and desire to secure by Letters Patent, is—

1. The combination of two sections of a pulley, and a pair of clamping-bolts C, applied to one side of the pulley so as to clamp the sections together upon the shaft, the said clamping-bolts being bent or curved between their ends, their bent or convexed portions being turned toward the opposite side of the pulley, whereby the clamping action of the bolts is extended equally along the full length of the pulley-hub, substantially as described.

2. The combination, with the sections of a pulley, of the flanges B B, secured thereto and provided with hub-sections B′, extending into the eye of the wheel, and the inwardly-turned bent bolts connecting said flanges, substantially as described.

3. The combination of the sections of a pulley, the flanges B, bolted thereto and provided with the hub-sections B′ and the ears or lugs $c\ c$ on their adjacent edges, said lugs having obliquely-set outer ends, and the bent or curved connecting-bolts, as described.

In testimony whereof we affix our signatures in presence of two witnesses.

ALBERT P. SIBLEY.
GEORGE O. WARE.

Witnesses:
M. E. LISTENBERGER,
C. S. JACKSON.